US010897548B2

(12) United States Patent
Kokomoto

(10) Patent No.: US 10,897,548 B2
(45) Date of Patent: Jan. 19, 2021

(54) IMAGE FORMING APPARATUS WHICH READS PAGE NUMBERS OF A DOCUMENT

(71) Applicant: KYOCERA Document Solutions Inc., Osaka (JP)

(72) Inventor: Mari Kokomoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/420,904

(22) Filed: May 23, 2019

(65) Prior Publication Data
US 2019/0373123 A1 Dec. 5, 2019

(30) Foreign Application Priority Data
May 30, 2018 (JP) ................. 2018-103833

(51) Int. Cl.
*H04N 1/00* (2006.01)
*G06F 3/12* (2006.01)
*G06K 15/00* (2006.01)

(52) U.S. Cl.
CPC ....... *H04N 1/00631* (2013.01); *G06F 3/1204* (2013.01); *G06F 3/1259* (2013.01); *G06K 15/403* (2013.01); *H04N 1/00331* (2013.01); *H04N 2201/0094* (2013.01)

(58) Field of Classification Search
None
See application file for complete search history.

(56) References Cited

U.S. PATENT DOCUMENTS

| 2002/0054382 | A1* | 5/2002 | Nanno | H04N 1/00572 358/498 |
| 2007/0171438 | A1* | 7/2007 | Itoh | H04N 1/00631 358/1.6 |
| 2017/0282606 | A1* | 10/2017 | Yatsunami | B41J 13/0018 |
| 2017/0282609 | A1* | 10/2017 | Yatsunami | B65H 5/062 |

FOREIGN PATENT DOCUMENTS

JP H 11-220557 A 8/1999

\* cited by examiner

*Primary Examiner* — Mohammad H Ghayour
*Assistant Examiner* — Pawan Dhingra
(74) *Attorney, Agent, or Firm* — Stein IP, LLC

(57) ABSTRACT

An image forming apparatus has an image reading portion sequentially generating image data of pages, a printing portion sequentially printing, a discharge portion sequentially discharging printed sheets, and a control portion making the discharge portion discharge the printed sheets to a set discharge position. The control portion detects the page numbers of a precedent read page and of a subsequent read page and sets, when the page numbers are not consecutive, the discharge position of the printed sheet corresponding to the subsequent read page to a different position from the discharge position of the printed sheet corresponding to the precedent read page.

5 Claims, 4 Drawing Sheets

WIDTH DIRECTION

IMAGE FORMING APPARATUS WHICH READS PAGE NUMBERS OF A DOCUMENT

INCORPORATION BY REFERENCE

This application is based upon and claims the benefit of priority from the corresponding Japanese Patent Application No. 2018-103833 filed on May 30, 2018, the entire contents of which are incorporated herein by reference.

BACKGROUND

The present disclosure relates to an image forming apparatus incorporating an image reading portion that reads a document and that generates image data.

Conventionally, there is known an image forming apparatus that, by performing character recognition with respect to the image data of pages read by an image reading portion, detects the page numbers of the pages read by the image reading portion.

A conventional image forming apparatus checks whether or not the order of the page numbers of the pages read by the image reading portion is the order specified by a user. When the order of the page numbers of the pages read by the image reading portion is not the order specified by a user, the conventional image forming apparatus notifies the user of it.

For example, in an image forming apparatus that can detect the page numbers of the pages read by the image reading portion, it is possible to check, with respect to two successively read pages, whether or not the page numbers of the page read earlier (here, referred to as the precedent read page) and of the page read subsequently (here, referred to as the subsequent read page) are consecutive.

Here, the page numbers of the precedent read page and of the subsequent read page being not consecutive suggests that a page is likely to be missing. Thus, when the page numbers of the precedent read page and of the subsequent read page are not consecutive (a page is likely to be missing), notifying a user of it helps improve the convenience to a user.

For example, suppose that, while copying a plurality of pages of a document on the image forming apparatus, a user receives a notification that a page is missing. In this case, a user additionally copies the missing page.

Then, probably, a user identifies the part (missing part) where the printed sheet corresponding to the missing page is to be inserted in the bundle of printed sheets acquired through copying for the first time, and inserts the printed sheet corresponding to the missing page at the missing part. To identify the missing part, for example, the user needs to perform operation including checking the order of the page numbers of the printed sheets acquired through copying for the first time. This, inconveniently, is troublesome to the user.

SUMMARY

According to one aspect of the present disclosure, an image forming apparatus includes an image reading portion, a printing portion, a discharge portion, and a control portion. The image reading portion continuously reads a plurality of pages of a document and sequentially generates the image data of the pages read from the document. The printing portion sequentially prints based on the image data of the pages. The discharge portion sequentially discharges the printed sheets acquired through printing. The control portion sets the discharge position of the printed sheets and makes the discharge portion discharge the printed sheets to the set discharge position. The control portion detects the page numbers of a precedent read page, which is, of two pages successively read by the image reading portion, the one read earlier, and of a subsequent read page, which is the other page read by the image reading portion subsequently to the precedent page, and sets, when the page numbers of the precedent read page and of the subsequent read page are not consecutive, the discharge position of the printed sheet corresponding to the subsequent read page to a different position from the discharge position of the printed sheet corresponding to the precedent read page.

DETAILED DESCRIPTION

Structure of a Multifunction Peripheral

Figure 1:
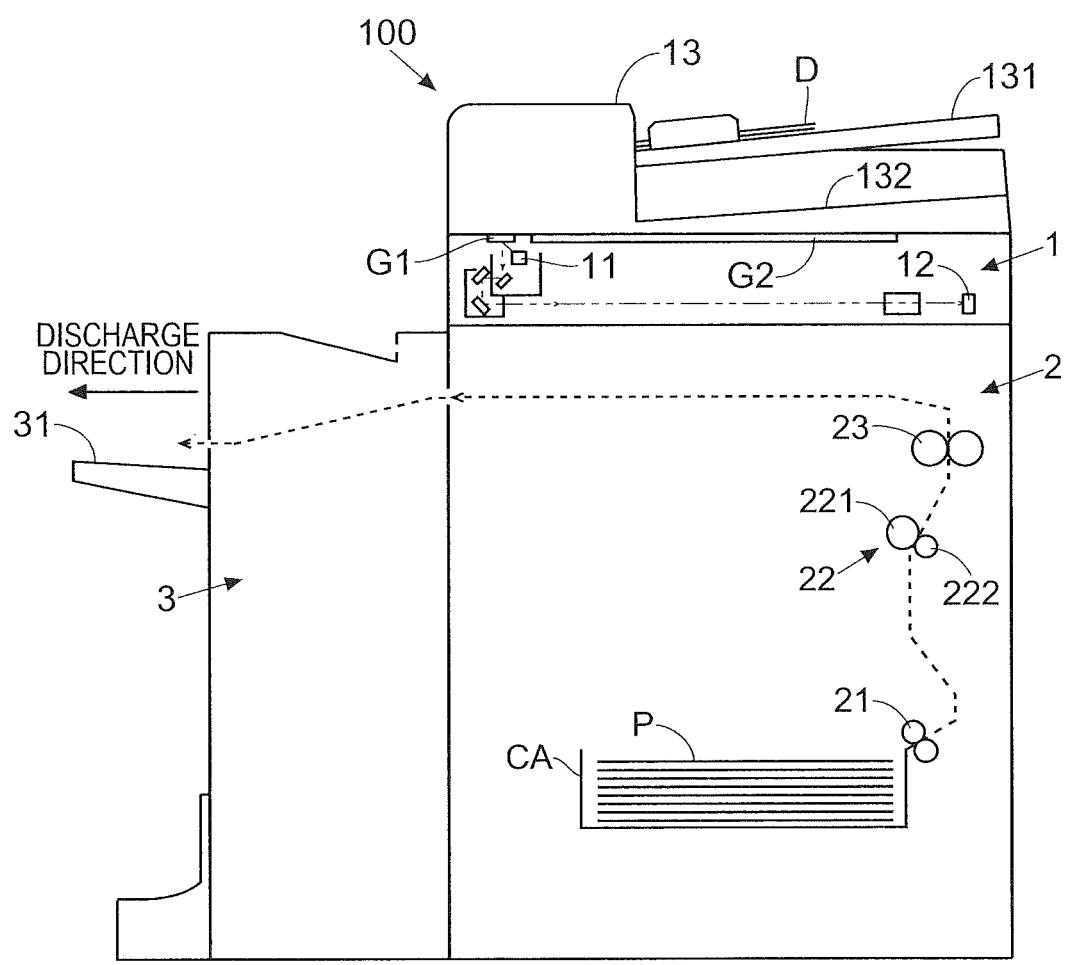
FIG. 1 is a schematic view showing a structure of a multifunction peripheral according to one embodiment of the present disclosure.

As shown in FIG. 1, a multifunction peripheral 100 (corresponding to an image forming apparatus) according to this embodiment includes an image reading portion 1. The image reading portion 1 reads a document D and generates image data of a page read from the document D.

The image reading portion 1 includes a light source 11 and an image sensor 12. The light source 11 irradiates the document D with light. The image sensor 12 receives the light reflected from the document D and performs photoelectric conversion. The light source 11 and the image sensor 12 are housed in a housing (reading housing) of the image reading portion 1. On the top face of the reading housing, contact glasses G1 and G2 are fitted. The contact glass G1 is a contact glass used for reading in a conveying reading mode, which will be described later. The contact glass G2 is a contact glass used for reading in a placement reading mode, which will be described later.

The image reading portion 1 includes a document conveying unit 13. The document conveying unit 13 is fitted so as to be openable and closable with respect to the top face of the reading housing. The document conveying unit 13 conveys the document D placed on a document placement tray 131 onto the contact glass G1 and discharges it onto a document discharge tray 132.

In the conveying reading mode, the document D is placed on the document placement tray 131. The document conveying unit 13 conveys the document D placed on the document placement tray 131 and discharges it onto the document discharge tray 132. While the document D is conveyed by the document conveying unit 13, the document D passes across the contact glass G1. The image reading portion 1 reads the document D passing across the contact glass G1 and generates image data.

In the placement reading mode, the document D is placed on the contact glass G2. For the sake of convenience, no illustration of a document D placed on the contact glass G2 is given. The image reading portion 1 reads the document D placed on the contact glass G2 and generates image data.

The multifunction peripheral 100 includes a printing portion 2. The printing portion 2 conveys a sheet P along a sheet conveying passage (in FIG. 1, indicated by a broken-line arrow), and while conveying it, prints an image on the sheet P. In a copy job, the printing portion 2 prints an image, on the sheet P, based on image data of a page that the image reading portion 1 generates by reading the document D.

The printing portion 2 includes a sheet feed roller pair 21. The sheet feed roller pair 21 feeds a sheet P stored in a sheet cassette CA into the sheet conveying passage. For example, over the sheet cassette CA, a pickup roller (unillustrated) is arranged. When the sheet feed roller pair 21 feeds a sheet P into the sheet conveying passage, the sheet P is extracted from the sheet cassette CA by the pickup roller.

Although no illustration is given here, the printing portion 2 includes a plurality of conveying roller pairs for conveying a sheet P along the sheet conveying passage. The sheet P fed to the sheet conveying passage is conveyed along the conveying passage by the conveying roller pairs.

The printing portion 2 includes an image forming portion 22. The image forming portion 22 includes a photosensitive drum 221 and a transfer roller 222. Although no illustration is given here, the image forming portion 22 also includes a charging device that electrostatically charges the circumferential face of the photosensitive drum 221, an exposure device that forms an electrostatic latent image on the circumferential face of the photosensitive drum 221, and a developing device that develops the electrostatic latent image on the circumferential face of the photosensitive drum 221 into a toner image.

The photosensitive drum 221 and the transfer roller 222 are in pressed contact with each other, and form a transfer nip. When the sheet P, while being conveyed, passes through the transfer nip, the toner image on the circumferential face of the photosensitive drum 221 is transferred to the sheet P.

The printing portion 2 includes a fixing roller pair 23. The fixing roller pair 23 includes a heating roller and a pressing roller. The heating roller incorporates a heater. The pressing roller is in pressed contact with the heating roller, and forms a fixing nip with the heating roller. The sheet P (the sheet P having the toner image transferred to it), while being conveyed, passes through the fixing nip, and thereby the toner image is fixed to the sheet P.

Here, the multifunction peripheral 100 includes a post-processing device 3. The post-processing device 3 is provided with a discharge tray 31. The post-processing device 3 receives from the printing portion 2 printed sheets (sheets P having toner images transferred to it) acquired through printing by the printing portion 2, and discharges the printed sheets onto the discharge tray 31. The post-processing device 3 corresponds to a discharge portion.

The post-processing device 3 performs post-processing on the printed sheets discharged onto the discharge tray 31. It performs, for example, punching and stapling. The post-processing performed by the post-processing device 3 also includes shifting.

In shifting, the post-processing device 3 shifts the printed sheets discharged onto the discharge tray 31 in the width direction (the direction perpendicular to the plane of FIG. 1) perpendicular to the discharge direction. By making the post-processing device 3 perform shifting, it is thus possible to change the position where the printed sheets are discharged onto the discharge tray 31. For example, suppose that, as shown in the left half of FIG. 2, a given printed sheet (in FIG. 2, identified by the reference sign Pa) has already been discharged onto the discharge tray 31. Then, suppose that, when the next printed sheet (here, identified by the reference sign Pb) is discharged, shifting is performed. In this case, as shown in the right half of FIG. 2, on the discharge tray 31, the discharge position of the printed sheet Pb shifts in the width direction with respect to the discharge position of the printed sheet Pa.

Figure 3:
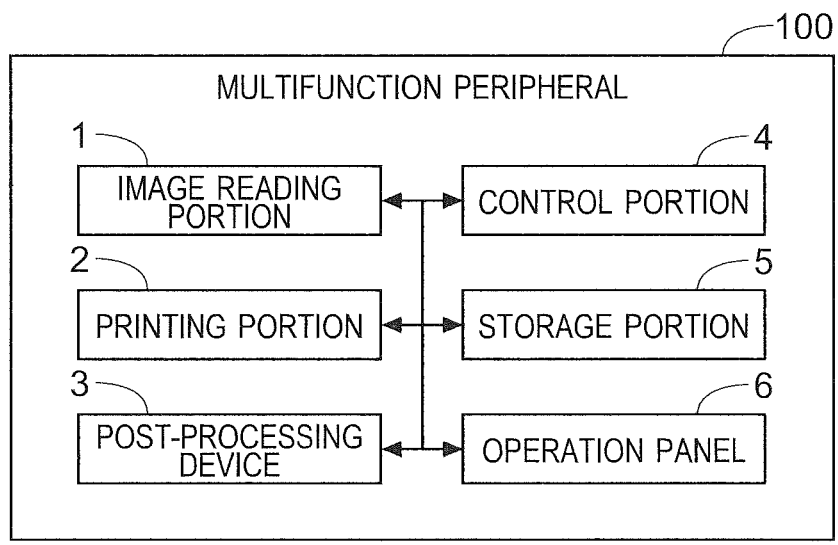
FIG. 3 is a block diagram showing a structure of the multifunction peripheral according to the one embodiment of the present disclosure.

As shown in FIG. 3, the multifunction peripheral 100 includes a control portion 4 and a storage portion 5. The control portion 4 includes a CPU. The control portion 4 operates based on programs and data for control, and controls different blocks in the multifunction peripheral 100.

The storage portion 5 includes a ROM and a RAM. The storage portion 5 stores programs and data for control. The storage portion 5 is connected to the control portion 4. The control portion 4 reads information from the storage portion 5 and writes information to the storage portion 5.

Here, the control portion 4 performs character recognition, which is processing for recognizing characters (including numbers such as Arabic numerals, Roman numerals, and Chinese numerals) included in the image data of a page that the image reading portion 1 generates by reading the document D. In character recognition by the control portion 4, for example, an OCR (optical character recognition) technology is used.

To enable the control portion 4 perform character recognition, a character database containing standard patterns (character patterns) for pattern matching is stored in the storage portion 5. In character recognition, the control portion 4 extracts character images from the image data of a processing target, and recognizes characters by comparing the extracted character images with the standard patterns.

The control portion 4 is connected with the image reading portion 1 and the printing portion 2. The control portion 4 controls the image reading portion 1 and the printing portion 2.

The control portion 4 is also connected with the post-processing device 3. The control portion 4 controls the post-processing device 3. That is, the control portion 4 controls post-processing (punching, stapling, and shifting) by the post-processing device 3.

The control portion 4 performs discharge position setting, which is processing for setting the position where the printed sheets are discharged onto the discharge tray 31, in order to control shifting by the post-processing device 3. In other words, the control portion 4 sets the direction and the amount of shifting of the printed sheets. The control portion 4 makes the post-processing device 3 discharge the printed sheets to the discharge position set by discharge position setting.

The multifunction peripheral 100 includes an operation panel 6. The operation panel 6 includes a touch screen and hardware buttons. The touch screen displays screens on which software buttons and messages are arranged, and accepts operation on the display screens from a user. A plurality of hardware buttons are provided on the operation panel 6. The hardware buttons provided on the operation panel 6 include, among others, a Start button for accepting from a user an instruction to execute a job.

The operation panel 6 is connected to the control portion 4. The control portion 4 controls the display on the operation panel 6. The control portion 4 detects operation performed on the operation panel 6.

A Check Function for Missing Pages

The multifunction peripheral 100 incorporates a check function for missing pages. The operation panel 6 accepts, from a user, a setting for enabling or disabling the check function for missing pages. In a state where the check function for missing pages is enabled, when the Start button is operated, the operation panel 6 accepts the operation as an instruction to execute a continuous copy job (a job to continuously copy a plurality of pages of a document D).

When the operation panel 6 accepts the instruction to execute the continuous copy job, the control portion 4 starts the continuous copy job. That is, the control portion 4 gives an instruction to start the job to the image reading portion 1, the printing portion 2, and the post-processing device 3. The image reading portion 1 continuously reads a plurality of pages of the document D, and sequentially generates image data of the pages read from the document D. The printing portion 2 sequentially prints based on the image data of the pages generated by the image reading portion 1. The post-processing device 3 sequentially discharges the printed sheets acquired through printing by the printing portion 2 onto the discharge tray 31.

When a document D is placed on the document placement tray 131, the control portion 4 makes the image reading portion 1 read the document D in the conveying reading mode. On the other hand, when no document D is placed on the document placement tray 131, the control portion 4 makes the image reading portion 1 read the document D in the placement reading mode. No document D being placed on the document placement tray 131 means a document D being placed on the contact glass G2 for the placement reading mode. In the continuous copy job in the placement reading mode, each time reading by the image reading portion 1 is completed, the Start button on the operation panel 6 needs to be operated.

Figure 2:
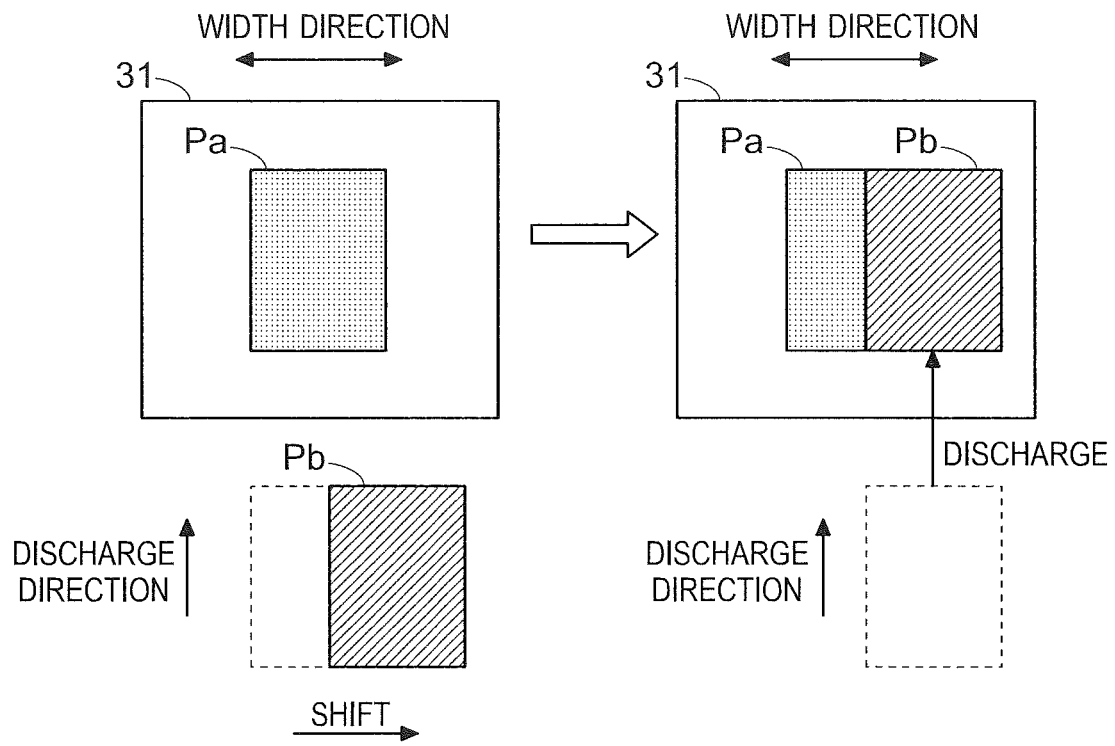
FIG. 2 is a diagram showing a discharge position of printed sheets discharged onto a discharge tray of the multifunction peripheral according to the one embodiment of the present disclosure.

When the continuous copy job is started, the control portion 4 sets a position where the printed sheets discharged from the post-processing device 3 are discharged onto the discharge tray 31. When the check function for missing pages is enabled, as a discharge position, either a first position, which is the default position, or a second position, which is shifted by a predetermined amount in the width direction with respect to the first position, is set. Although no particular limitation is meant, the discharge position of the printed sheet Pa shown in FIG. 2 is the first position, and the discharge position of the printed sheet Pb shown in FIG. 2 is the second position.

For example, at the start of the continuous copy job, the discharge position of the printed sheets is set to the first position. In other words, the control portion 4 sets to the first position the discharge position of a printed sheet corresponding to a page read by the image reading portion 1 for the first time. The control portion 4 does not change the discharge position until the printed sheet corresponding to the page read by the image reading portion 1 for the first time is discharged onto the discharge tray 31. Thus, the first printed sheet in the continuous copy job is discharged in the first position.

To detect the page number of the page read by the image reading portion 1 for the first time, the control portion 4 performs character recognition with respect to the image data of the page read by the image reading portion 1 for the first time. Here, the control portion 4 performs character recognition with respect to a predetermined region in the image data of the processing target, and detects a number included in the predetermined region as a page number. For example, the predetermined region is set by a user. The operation panel 6 accepts a setting for the predetermined region from a user. Generally, a header region or a footer region is set as the predetermined region.

The control portion 4 also detects the page numbers of pages read by the image reading portion 1 for the second and following times. That is, the control portion 4 detects the page numbers of a precedent read page, which is, of two pages successively read by the image reading portion 1, the one read earlier, and of a subsequent read page, which is the other page read by the image reading portion 1 subsequently to the precedent page. With respect to the image data of the pages read by the image reading portion 1 for the second and following times, the control portion 4 performs character recognition (processing for detecting page numbers) similar to that performed with respect to the image data of the page read by the image reading portion 1 for the first time.

When the page number is detected from the image data of the page read by the image reading portion 1 for the first time, after reading by the image reading portion 1 for the second time, each time reading by the image reading portion 1 is completed, the control portion 4 makes a check for missing pages. This will be described more specifically with reference to a flow chart shown in FIG. 4.

Figure 4:
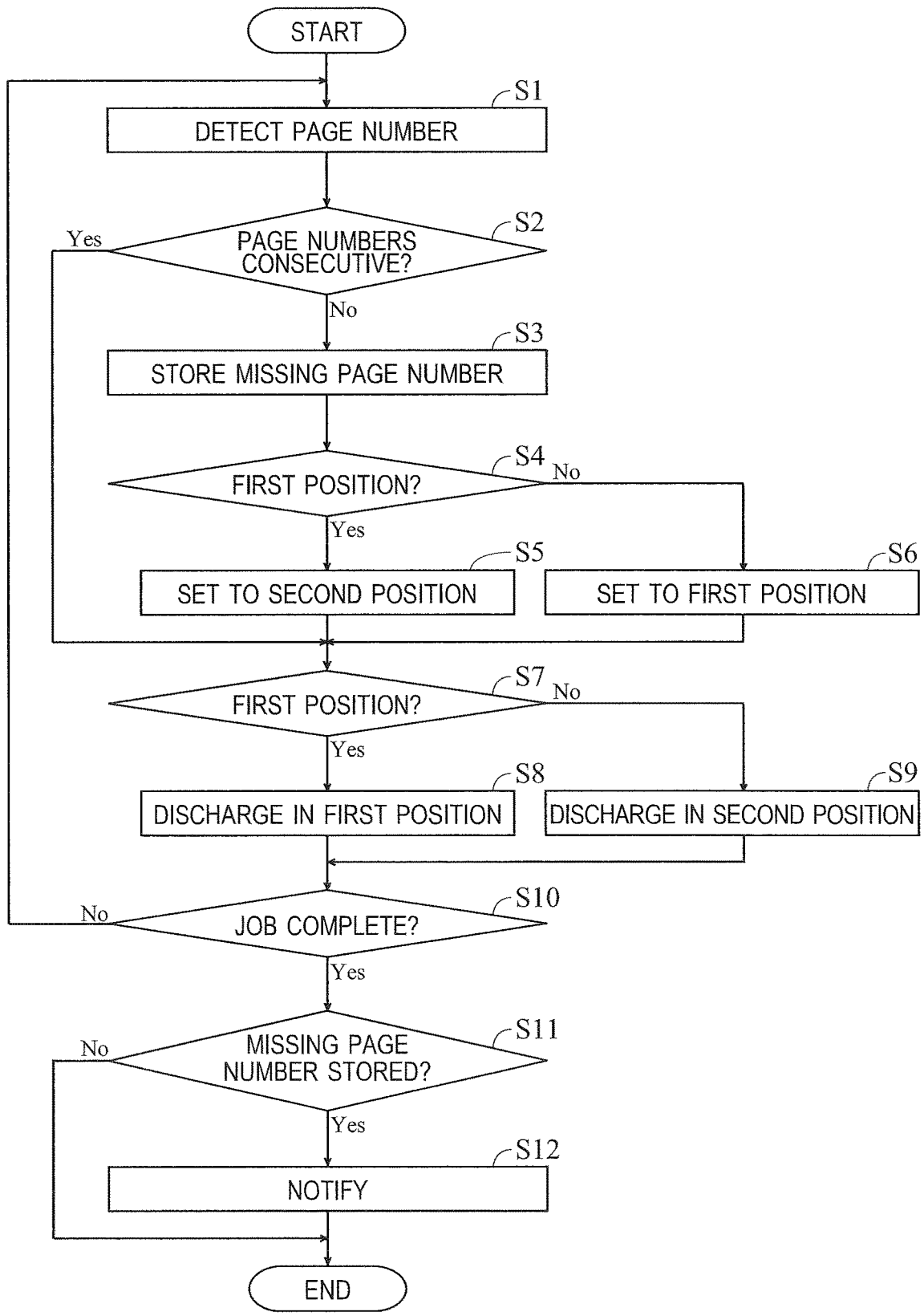
FIG. 4 is a flow chart showing the flow of processing performed by a control portion of the multifunction peripheral according to the one embodiment of the present disclosure.

Suppose that, at the start of the procedure in FIG. 4, reading by the image reading portion 1 for the first time has been completed, and the control portion 4 has detected the page number of the page read by the image reading portion 1 for the first time. Also suppose that the printed sheet corresponding to the page read by the image reading portion 1 for the first time has been discharged in the first position (the discharge position has been set to the first position).

At step S1, the control portion 4 acquires image data of a new page read by the image reading portion 1 as the processing target. By performing character recognition with respect to the image data of the processing target, the control portion 4 detects the page number of the new page read by the image reading portion 1. Here, the processing target for character recognition is the image data of a page that the image reading portion 1 acquires by reading for the second or any following time.

At step S2, the control portion 4 checks whether or not the page numbers of a precedent read page and of a subsequent read page are consecutive. For example, when the page number detected at step S1 is the page number of the page read for the second time, the page read for the first time is the precedent read page, and the page read for the second time is the subsequent read page. When the page number detected at step S1 is the page number of the page read for the third time, the page read for the second time is the precedent read page, and the page read for the third time is the subsequent read page.

If, at step S2, the control portion 4 determines that the page numbers of the precedent read page and of the subsequent read page are not consecutive, the flow proceeds to step S3. When the flow proceeds to step S3, the control portion 4 recognizes any page number between the page numbers of the precedent read page and of the subsequent read page as a missing page number. Then, the control portion 4 makes the storage portion 5 store information indicating the missing page number.

At step S4, the control portion 4 checks whether or not the discharge position of the printed sheet corresponding to the precedent read page is the first position. As a result, if the control portion 4 determines that the discharge position of the printed sheet corresponding to the precedent read page is the first position, the flow proceeds to step S5, and if the control portion 4 determines that the discharge position of the printed sheet corresponding to the precedent read page is the second position, the flow proceeds to step S6.

When the flow proceeds to step S5, the control portion 4 sets (changes) to the second position the discharge position of the printed sheet corresponding to the subsequent read page. On the other hand, when the flow proceeds to step S6, the control portion 4 sets (changes) to the first position the discharge position of the printed sheet corresponding to the subsequent read page.

For example, when the precedent read page is the page read for the first time and the subsequent read page is the page read for the second time, the discharge position of the printed sheet corresponding to the precedent read page is set to the first position, and thus the discharge position of the printed sheet corresponding to the subsequent read page is set to the second position. When the precedent read page is the page read for the second or any following time and the discharge position of the printed sheet corresponding to the precedent read page is set to the second position, the discharge position of the printed sheet corresponding to the subsequent read page is set to the first position.

After the discharge position is set, the flow proceeds to step S7. Also if, at step S2, the control portion 4 determines that the page numbers of the precedent read page and of the subsequent read page are consecutive, the flow proceeds to step S7. When the flow proceeds to step S7 from step S2 without going through any other step, the control portion 4 sets the discharge position of the printed sheet corresponding to the subsequent read page to the same position as the discharge position of the printed sheet corresponding to the precedent read page (does not change the discharge position).

At step S7, the control portion 4 checks whether or not the currently set discharge position is the first position. When the flow proceeds to step S7 via step S5 or step S6, the control portion 4 checks whether or not the discharge position after the change is the first position. As a result, if the control portion 4 determines that the currently set discharge position (the discharge position after the change) is the first position, the flow proceeds to step S8, and if the control portion 4 determines that the currently set discharge position (the discharge position after the change) is the second position, the flow proceeds to step S9.

When the flow proceeds to step S8, the control portion 4 makes the printing portion 2 print based on the image data of the page read by the image reading portion 1. Then, the control portion 4 controls the post-processing device 3 to discharge the printed sheet acquired through printing by the printing portion 2 to the first position on the discharge tray 31.

When the flow proceeds to step S9, the control portion 4 makes the printing portion 2 print based on the image data of the page read by the image reading portion 1. Then, the control portion 4 controls the post-processing device 3 to discharge the printed sheet acquired through printing by the printing portion 2 to the second position on the discharge tray 31.

At step S10, when the control portion 4 checks whether or not the continuous copy job is complete (whether or not no image data to be the processing target remains). In the continuous copy job in the conveying reading mode, when the document D runs out on the document placement tray 131, the control portion 4 determines that the continuous copy job is complete. In the continuous copy job in the placement reading mode, when the operation panel 6 accepts an instruction to finish the continuous copy job from a user, the control portion 4 determines that the continuous copy job is complete.

If, at step S10, the control portion 4 determines that the continuous copy job is not complete, the flow proceeds to step S1. In this case, the control portion 4 repeats processing along the flow shown in FIG. 4. That is, each time reading by the image reading portion 1 is completed, the control portion 4 checks whether or not the page numbers of the page read by image reading portion 1 the previous time (this page is the precedent read page) and of the page read by the image reading portion 1 this time (this page is the subsequent read page) are consecutive.

If, at step S10, the control portion 4 determines that the continuous copy job is complete, the flow proceeds to step S11. When the flow proceeds to step S11, the control portion 4 checks whether or not information indicating the missing page number is stored in the storage portion 5. As a result, if the control portion 4 determines that information indicating the missing page number is stored in the storage portion 5, the flow proceeds to step S12, and if the control portion 4 determines that no information indicating the missing page number is stored in the storage portion 5, the procedure ends.

Figure 5:
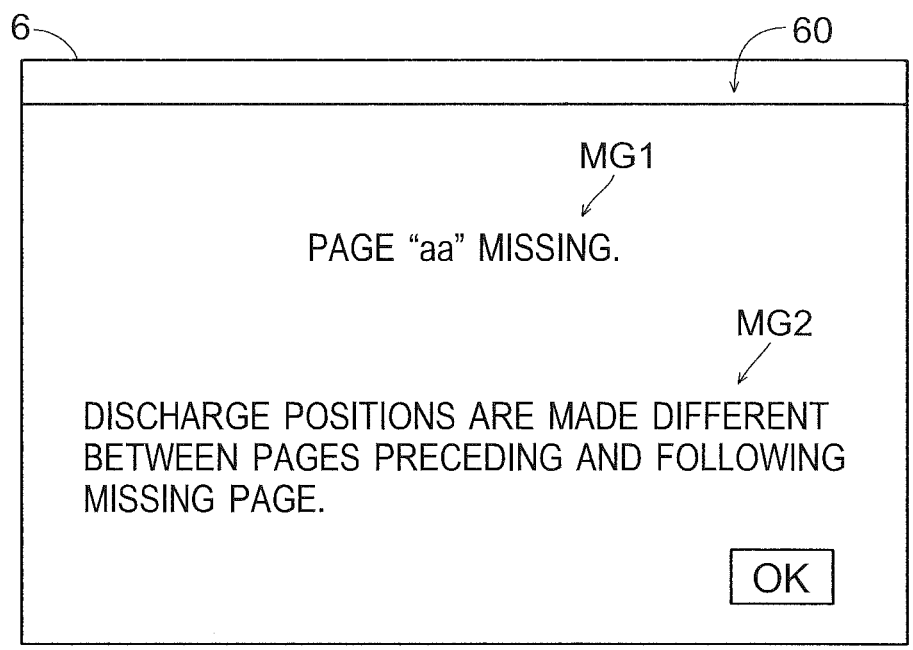
FIG. 5 is a diagram showing a notification screen displayed on an operation panel of the multifunction peripheral according to the one embodiment of the present disclosure.

When the flow proceeds to step S12, the control portion 4 makes the operation panel 6 notify that a page is missing. In this configuration, the operation panel 6 corresponds to a notification part. Here, the operation panel 6 displays a notification screen 60 as shown in FIG. 5 to notify a user that a page is missing.

On the notification screen 60, a notification message MG1 including the missing page number is displayed. In the example shown in FIG. 5, the missing page number is substituted in "aa".

On the notification screen 60, a notification message MG2 is also displayed that indicates that the discharge position of the printed sheet corresponding to the page of the page number which is a number preceding the missing page number and the discharge position of the printed sheet corresponding to the page of the page number which is a number following the missing page number are made different.

Figure 6:
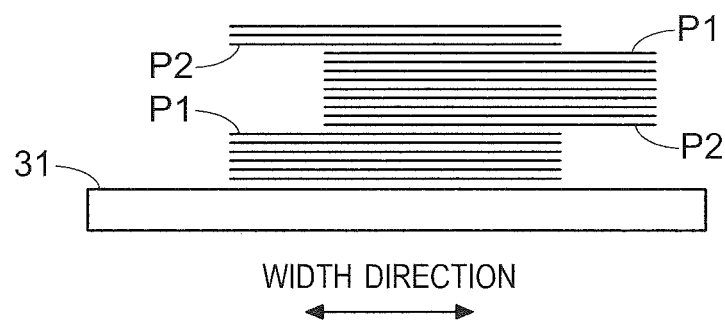
FIG. 6 is a diagram showing a state of discharged sheets on the discharge tray in a case where the discharge position is changed while a continuous copy job is executed in the multifunction peripheral according to the one embodiment of the present disclosure.

For example, FIG. 6 shows the state of the printed sheets on the discharge tray 31 when a page is missing. In FIG. 6, the printed sheet corresponding to the page of the page number which preceding the missing page number is identified by the reference sign P1, and the printed sheet corresponding to the page of the page number following the missing page number is identified by the reference sign P2. When the control portion 4 determines twice that the page numbers of the precedent read page and of the subsequent read page are not consecutive, the printed sheets on the discharge tray 31 are in a state as shown in FIG. 6.

Even when the check function for missing pages is enabled, if the control portion 4 does not detect the page number of the page read by the image reading portion 1 for the first time, the control portion 4 does not change the discharge position of the printed sheet while the continuous copy job is being performed. That is, the control portion 4 sets all the discharge position of the printed sheets corresponding to the pages read by the image reading portion 1 for the second and following times to the same position as the discharge position of the printed sheet corresponding to the page read by the image reading portion 1 for the first time. Thus, all the printed sheets in the continuous copy job are discharged in the same position on the discharge tray 31.

As described above, the multifunction peripheral 100 (image forming apparatus) according to this embodiment includes: the image reading portion 1 that continuously reads a plurality of pages of the document D and that sequentially generates image data of the pages read from the document D, the printing portion 2 that sequentially prints based on the image data of the pages, the post-processing device 3 (discharge portion) that sequentially discharges the printed sheets acquired through printing, and the control portion 4 that sets the discharge position of the printed sheets and that makes the post-processing device 3 discharge the printed sheets to the set discharge position. The control portion 4 detects the page numbers of the precedent read page, which is, of two successive pages, the one read by the image reading portion 1 earlier, and of the subsequent read page, which is the other page read by the image reading portion 1 subsequently to the precedent page. When the page numbers of the precedent read page and of the subsequent read page are not consecutive, the control portion 4 sets the discharge position of the printed sheet corresponding to the subsequent read page to a different position from the discharge position of the printed sheet corresponding to the precedent read page.

With the configuration according to this embodiment, when a page to be copied is missing, the printed sheet corresponding to the page (precedent read page) preceding this missing page and the printed sheet corresponding to the page (subsequent read page) following this missing page are discharged in the different positions from each other. Specifically, on the discharge tray 31, the discharge position of the printed sheet corresponding to the page preceding the missing page is shifted by a predetermined amount in the width direction with respect to the discharge position of the printed sheet corresponding to the page following the missing page (see FIG. 5). In this way, it is possible to improve the ease of operation for identifying a missing part (a part where the printed sheet corresponding to the missing page is to be inserted) in a bundle of printed sheets. With the configuration according to this embodiment, a part in the bundle of printed sheets where the printed sheets are shifted in the width direction is the missing part.

In this embodiment, as described above, when the page numbers of the precedent read page and of the subsequent read page are not consecutive, if the discharge position of the printed sheet corresponding to the precedent read page is set to the first position, the control portion 4 sets to the second position the discharge position of the printed sheet corresponding to the subsequent read page, and if the discharge position of the printed sheet corresponding to the precedent read page is set to the second position, the control portion 4 sets to the first position the discharge position of the printed sheet corresponding to the subsequent read page. Thus, when the page numbers of the precedent read page and of the subsequent read page are not consecutive, it is easily possible to make different the discharge position of the printed sheet corresponding to the precedent read page and the discharge position of the printed sheet corresponding to the subsequent read page.

In this embodiment, as described above, when the page numbers of the precedent read page and of the subsequent read page are not consecutive, the control portion 4 recognizes any page number between the page numbers of the precedent read page and of the subsequent read page as a missing page number, and makes the operation panel 6 (notification part) notify of the missing page number. In addition to notification of the missing page number, the control portion 4 makes the operation panel 6 notify that the discharge position of the printed sheet corresponding to the page of the page number preceding the missing page number and the discharge position of the printed sheet corresponding to the page of the page number following the missing page number are different. That is, the control portion 4 makes the operation panel 6 display the notification messages MG1 and MG2. It is thus possible to improve the convenience to a user who is trying to identify the missing part.

Here, a configured as described below is also possible.

Each time the control portion 4 determines that the page numbers of the precedent read page and of the subsequent read page are not consecutive, it makes the operation panel 6 notify that a page is missing (the page numbers of the precedent read page and of the subsequent read page are not consecutive).

However, displaying notification each time a page is missing may annoy a user. Some users may intentionally skip a page. Thus, the following configuration is possible.

When the control portion 4 determines that, while reading by the image reading portion 1 is performed for the first to nth times (where n is a predetermined number, for example, ten), the page numbers of a precedent read page and of a subsequent read page are not consecutive a threshold number of times or more, even if the control portion 4 determines that, after reading by the image reading portion 1 is performed for the first to nth times, the page numbers of a precedent read page and of a subsequent read page are not consecutive, it does not make the operation panel 6 notify that a page is missing.

The multifunction peripheral 100 may also be provided with a sound output portion, and each time the control portion 4 determines that the page numbers of the precedent read page and of the subsequent read page are not consecutive, the sound output portion may output an alarm. The sound output portion includes a memory for storing sound data of the alarm, a speaker for outputting the alarm, and the like. With this configuration, the sound output portion functions as the notification part.

The embodiments disclosed herein should be understood to be in every respect illustrative and not restrictive. The scope of the present disclosure is not defined by the description of embodiments given above but by the appended claims, and encompasses any modifications made in the sense and scope equivalent to those of the claims.

What is claimed is:

1. An image forming apparatus comprising:
   an image reading portion that continuously reads a plurality of pages of a document, the image forming portion sequentially generating image data of pages read from the document;
   a printing portion that sequentially prints based on the image data of the pages;
   a discharge portion that sequentially discharges printed sheets acquired through printing; and
   a control portion that sets a discharge position of the printed sheets, the control portion making the discharge portion discharge the printed sheets to the set discharge position,
   wherein
   the control portion detects page numbers of a precedent read page, which is, of two pages successively read by the image reading portion, one read earlier, and of a subsequent read page, which is, of two pages, another page read by the image reading portion subsequently to the precedent page, and sets, when the page numbers of the precedent read page and of the subsequent read page are not consecutive, the discharge position of the printed sheet corresponding to the subsequent read page to a different position from the discharge position of the printed sheet corresponding to the precedent read page, the discharge position comprises a first position and a second position, the first position is a default position, the second position is a position where part of the printed sheets discharged in the second position overlap with the printed sheets discharged in the first position, and the control portion when the page numbers of the precedent read page and of the subsequent read page are not consecutive, sets, if the discharge position of the printed sheet corresponding to the precedent read page is set to the first position, the discharge position of the printed sheet corresponding to the subsequent read page to the second position, sets, if the discharge position of the printed sheet corresponding to the precedent read page is set to the second position, the discharge position of the printed sheet corresponding to the subsequent read page to the first position, each time reading by the image reading portion is completed, the control portion checks, taking a page read by the image reading portion the previous time as the precedent read page and taking a page read by the image reading portion this time as the subsequent read page, sequentially checks whether page numbers of the precedent read page and of the subsequent read page are consecutive, in a state where, as a result of the page numbers of the precedent read page and of the subsequent read page being determined to be not consecutive, the discharge position of the printed sheet corresponding to the page read the previous time is set in the second position, if page numbers of the page read the previous time and of the page read this time are determined to be consecutive, the control portion keeps the discharge position of the printed sheet corresponding to the page read this time in the second position and thereafter, so long as the page numbers of the page read the previous time and of the page read this time are determined to be consecutive, the control portion keeps the discharge position of the printed sheet corresponding to the page read this time in the second position, and in a state where, as a result of the page numbers of the precedent read page and of the subsequent read page being determined to be not consecutive, the discharge position of the printed sheet corresponding to the page read the previous time is set in the first position, if page numbers of the page read the previous time and of the page read this time are determined to be consecutive, the control portion keeps the discharge position of the printed sheet corresponding to the page read this time in the first position and thereafter, so long as the page numbers of the page read the previous time and of the page read this time are determined to be consecutive, the control portion keeps the discharge position of the printed sheet corresponding to the page read this time in the first position.

2. The image forming apparatus according to claim 1, further comprising:

a notification part, wherein the control portion when the page numbers of the precedent read page and of the subsequent read page are not consecutive, recognizes any page number between the page numbers of the precedent read page and of the subsequent read page as a missing page number, and makes the notification part notify of the missing page number.

3. The image forming apparatus according to claim 2, wherein, the control portion makes the notification part notify, in addition to notification of the missing page number, that the discharge position of the printed sheet corresponding to the page of a page number preceding the missing page number and the discharge position of the printed sheet corresponding to the page of a page number following the missing page number are different.

4. The image forming apparatus according to claim 1, further comprising:

a notification part, wherein each time the control portion determines that the page numbers of the precedent read page and of the subsequent read page are not consecutive, the control portion makes the notification part notify that the page numbers of the precedent read page and of the subsequent read page are not consecutive.

5. The image forming apparatus according to claim 1, further comprising:

a notification part that notifies a user that the page numbers of the precedent read page and of the subsequent read page are not consecutive, wherein when the control portion determines that, while reading by the image reading portion is performed for a first to nth times, where n is a predetermined number, the page numbers of the precedent read page and of the subsequent read page are not consecutive a threshold number of times or more, even if the control portion determines that, after reading by the image reading portion is performed for the first to nth times, the page numbers of the precedent read page and of the subsequent read page are not consecutive, the control portion does not make the notification part notify that the page numbers of the precedent read page and of the subsequent read page are not consecutive.

* * * * *